US012555010B2

(12) United States Patent
Ghosh et al.

(10) Patent No.: US 12,555,010 B2
(45) Date of Patent: Feb. 17, 2026

(54) BAYESIAN VARIATIONAL INFERENCE USING ASYMMETRIC HAMILTONIAN MONTE CARLO

(71) Applicant: INTERNATIONAL BUSINESS MACHINES CORPORATION, Armonk, NY (US)

(72) Inventors: Soumyadip Ghosh, Peekskill, NY (US); Yingdong Lu, Yorktown Heights, NY (US); Tomasz J. Nowicki, Fort Montgomery, NY (US)

(73) Assignee: International Business Machines Corporation, Armonk, NY (US)

( * ) Notice: Subject to any disclaimer, the term of this patent is extended or adjusted under 35 U.S.C. 154(b) by 609 days.

(21) Appl. No.: 18/159,075

(22) Filed: Jan. 24, 2023

(65) Prior Publication Data
US 2024/0249169 A1   Jul. 25, 2024

(51) Int. Cl.
*G06N 7/01*   (2023.01)
(52) U.S. Cl.
CPC ..................................... *G06N 7/01* (2023.01)
(58) Field of Classification Search
CPC ....................................................... G06N 7/01
See application file for complete search history.

(56) References Cited

U.S. PATENT DOCUMENTS

| 7,072,811 | B2 | 7/2006 | Kadane et al. |
| 8,045,604 | B2 | 10/2011 | Farhang-Boroujeny et al. |
| 9,009,095 | B1 | 4/2015 | Fafri et al. |
| 9,710,428 | B2 | 7/2017 | Macaro et al. |
| 10,147,044 | B2 | 12/2018 | Steele, Jr. et al. |
| 10,227,391 | B2 | 3/2019 | Herlitze et al. |
| 10,360,317 | B2 * | 7/2019 | Hill ........................ G01V 1/303 |
| 10,387,900 | B2 | 8/2019 | Bledsoe et al. |
| 10,496,929 | B2 | 12/2019 | Tristan et al. |
| 10,586,158 | B2 | 3/2020 | Chen et al. |

(Continued)

FOREIGN PATENT DOCUMENTS

| CN | 102033994 B | 4/2013 |
| CN | 110879873 A | 3/2020 |
| CN | 113381886 A | 9/2021 |

OTHER PUBLICATIONS

Ghosh, S. et al., "On Convergence of Hamiltonian Monte Carlo with Asymmetrical Momentum Distributions"; IBM Research AI (2021), 25 pgs.

*Primary Examiner* — David E Choi
(74) *Attorney, Agent, or Firm* — CHIP LAW GROUP

(57) ABSTRACT

A method of Bayesian Variational Inference using Asymmetric Hamiltonian Monte Carlo includes gathering a number of data samples for a Hamiltonian Monte Carlo computation and instantiating an auxiliary distribution on the data samples, the auxiliary distribution being asymmetric. A Hamiltonian Monte Carlo computation is performed with the auxiliary distribution and the plurality of data samples. Upon determining that a metric of the computation outcome does not meet a target metric criterion that is based on a target distribution, the auxiliary distribution is adapted to an output of the computation and the Hamiltonian Monte Carlo computation is re-executed with the adapted auxiliary distribution. A report is generated in response to determining that the target metric is well estimated.

20 Claims, 5 Drawing Sheets

(56) References Cited

U.S. PATENT DOCUMENTS

| | | | |
|---|---|---|---|
| 10,706,191 B2 | 7/2020 | Sun et al. | |
| 10,769,347 B1 | 9/2020 | Schuermyer | |
| 10,895,566 B1 | 1/2021 | Teepe et al. | |
| 11,055,454 B1* | 7/2021 | Gasser | G06F 30/20 |
| 11,106,993 B1* | 8/2021 | Dallaire-Demers | H03K 19/195 |
| 11,314,536 B2* | 4/2022 | Lee | G06F 17/16 |
| 11,620,534 B2* | 4/2023 | Matsuo | G06N 5/01 706/46 |
| 2004/0073505 A1* | 4/2004 | Wright | G06Q 40/08 705/36 R |
| 2010/0312775 A1* | 12/2010 | Haas | G06F 16/2462 707/769 |
| 2019/0026642 A1 | 1/2019 | Hedstrom et al. | |
| 2019/0384597 A1* | 12/2019 | Horesh | G06F 9/3001 |
| 2020/0065439 A1* | 2/2020 | Babbush | G16C 10/00 |
| 2020/0090071 A1* | 3/2020 | Franzke | G06F 17/18 |
| 2020/0293936 A1* | 9/2020 | Granade | G06N 10/20 |
| 2021/0157877 A1* | 5/2021 | Mezzacapo | G06F 17/16 |
| 2021/0374582 A1 | 12/2021 | Tristan et al. | |
| 2023/0368064 A1* | 11/2023 | O'Brien | G06N 10/40 |
| 2024/0170103 A1* | 5/2024 | Pham | G06N 10/70 |
| 2024/0249169 A1* | 7/2024 | Ghosh | G06N 7/01 |
| 2024/0289659 A1* | 8/2024 | Babbush | G06N 10/20 |
| 2024/0296362 A1* | 9/2024 | Huggins | G06N 5/01 |
| 2024/0428112 A1* | 12/2024 | Zhu | G06N 7/01 |

* cited by examiner

BAYESIAN VARIATIONAL INFERENCE USING ASYMMETRIC HAMILTONIAN MONTE CARLO

BACKGROUND

Technical Field

The present disclosure generally relates to Variational Inference, and more particularly, to Bayesian Variational Inference using Asymmetric Hamiltonian Monte Carlo.

Description of the Related Art

In statistics, problems may be solved by creating statistical models of actual occurrences and then examining the various probability that particular events will occur in the model. These methods can be used to estimate the likelihood, based on data gathered, of an event occurring.

Naturally, the quality of the statistical model and speed of computations has a significant bearing on the validity of the study (i.e., on how well it approximates reality) and its applicability.

BRIEF SUMMARY

According to an embodiment of the present disclosure a method of Bayesian Variational Inference using Asymmetric Hamiltonian Monte Carlo is disclosed. In the method, a number of data samples are received for a Hamiltonian Monte Carlo computation and an auxiliary distribution is instantiated on the data samples, the auxiliary distribution being chosen by the user, in particular may be asymmetric. A Hamiltonian Monte Carlo computation is performed with the auxiliary distribution and the data samples. Upon determining that a metric of the computation outcome does not meet a target metric criterion, the auxiliary distribution is adapted and the Hamiltonian Monte Carlo computation is re-executed with the adapted auxiliary distribution. A report is generated in response to determining that the metric of the computation outcome meets the target metric criteria.

In one embodiment, the auxiliary distribution is non-Gaussian.

In one embodiment, the auxiliary distribution has restricted domains.

In one embodiment, the Hamiltonian Monte Carlo computation is performed by executing a forward motion Hamiltonian Monte Carlo step and a backward motion Hamiltonian Monte Carlo step, in alternate directions, to ensure fast convergence.

In one embodiment, the method includes adapting the auxiliary distribution by estimating a number of modes in the target distribution and augmenting the auxiliary distribution to have the same number of modes.

According to an embodiment of the present disclosure a computer program product is disclosed. The computer program product includes one or more computer-readable storage devices and program instructions stored on at least one of the one or more tangible storage devices, the program instructions executable by a processor, the program instructions including program instructions to gather a number of data samples for a Hamiltonian Monte Carlo computation and to instantiate an auxiliary distribution on the data samples. The auxiliary distribution is chosen by a user and may be asymmetric. The computer program product also includes program instructions to execute a Hamiltonian Monte Carlo computation with the auxiliary distribution and the data samples and to determine that a metric of the computation outcome does not meet a target metric criterion that is based on a target distribution, adapt the auxiliary distribution to the outcome, and re-execute the Hamiltonian Monte Carlo computation with the adapted auxiliary distribution. The computer program product also includes program instructions to generate a report in response to determining that the metric of the computation outcome meets the target metric criteria.

According to an embodiment of the present disclosure, a (e.g., non-transitory) computer-readable storage medium tangibly embodying a computer readable program code is disclosed. The computer readable program code includes computer readable instructions that, when executed, causes a processor to carry out a method that includes receiving a number of data samples are for a Hamiltonian Monte Carlo computation and instantiating an auxiliary distribution on the data samples, the auxiliary distribution being asymmetric. The processor performs a Hamiltonian Monte Carlo computation with the auxiliary distribution and the data samples. Upon determining that a metric of the computation outcome does not meet a target metric criterion, the processor adapts the auxiliary distribution and re-executes the Hamiltonian Monte Carlo computation with the adapted auxiliary distribution. The processor generates a report in response to determining that the target metric is well estimated.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Overview

Figure 1:
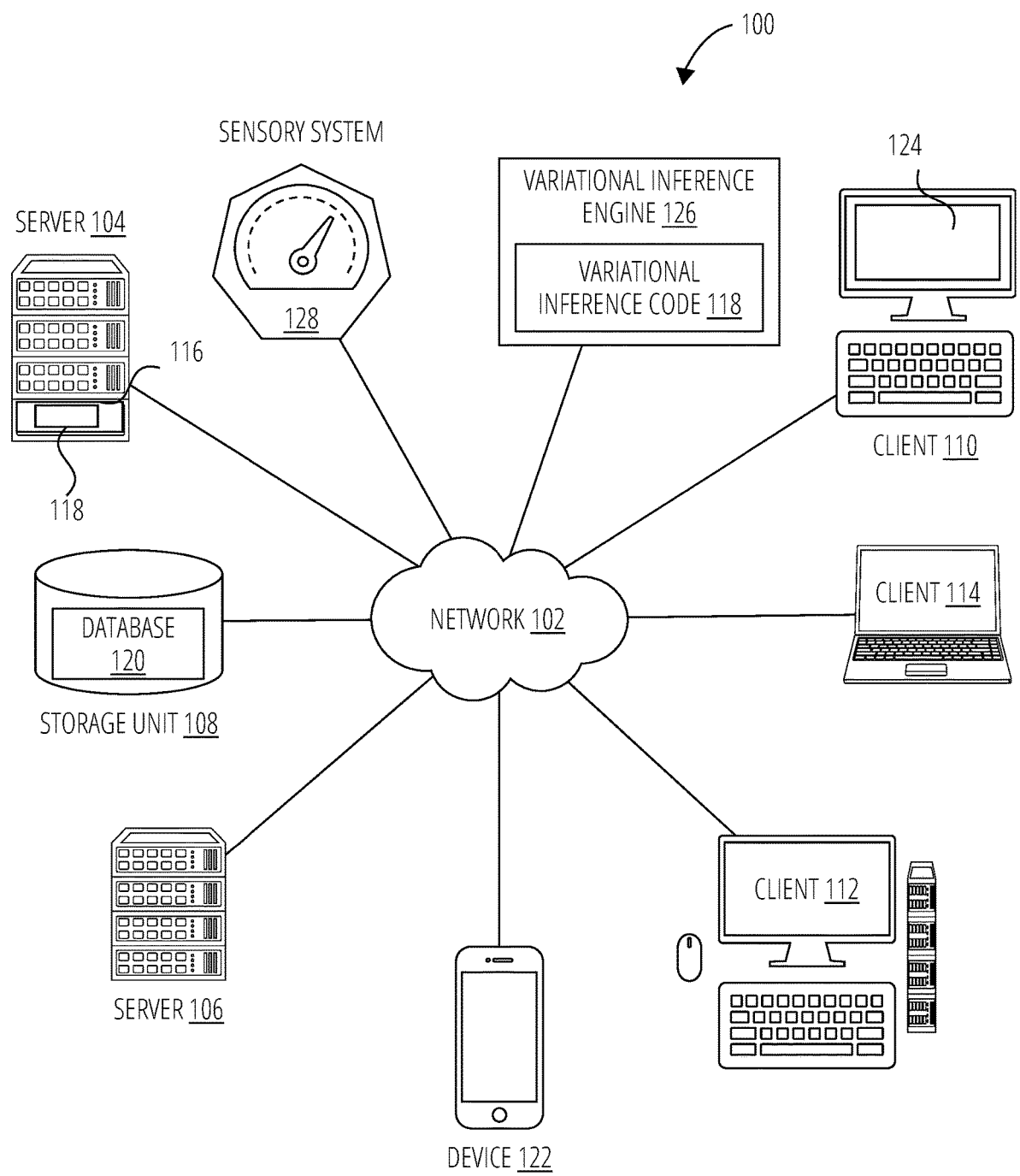
FIG. 1 depicts a block diagram of a network of data processing systems in accordance with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Methods like Markov Chain Monte Carlo (MCMC) may allow statisticians to work with complex models, albeit with some drawbacks. Conventional MCMC computation methods can be computationally intensive, relying on the computation of large numbers of possible outcomes. The importance of Bayesian analysis has however, grown over the years due to the development of the MCMC computation methods. The foundation of Bayesian analysis is Bayes' theorem, which purports that the probability of a hypothesis given some data is proportional to the probability of the data given the hypothesis, multiplied by the prior probability of the hypothesis. This means that Bayesian analysis can allow one to update their beliefs about the probability of an event or a hypothesis given new data, by combining prior knowledge with new observations. This approach can be used in Bayesian statistics and machine learning to update the parameters of a model given new data. Bayesian analysis tends to be focused on the analysis of the so-called "posterior distribution," and MCMC computation methods can produce approximate samples from this distribution. In Bayesian Variational Inference, a goal may be to find a simple distribution (a variational distribution) that approximates the true posterior distribution given the observed data and the prior distribution. This may be achieved by minimizing the Kullback-Leibler (KL) divergence between the variational distribution and the true posterior distribution. It is however, recognized that conventional MCMC methods are computationally expensive.

Hamiltonian Monte Carlo (HMC) may perform better than conventional MCMC in practice. HMC belongs to the wider class of MCMC algorithms that approximate the difficult-to-compute density of a target probability measure by running a Markov chain whose invariant measure coincides with the target distribution. HMC may take advantage of the geometry of the target distribution to generate samples that converge faster to the true distribution than other methods. HMC can explore the parameter space of a target distribution by simulating the motion of a particle under the influence of a fictitious Hamiltonian dynamics. The Hamiltonian dynamics conserves the total energy of the system, and by defining the potential energy of the system to be proportional to the negative log-density of the target distribution, the algorithm is able to explore the high-dimensional parameter space more efficiently. The canonical HMC algorithm uses Gaussian distributed auxiliary momentum variables, with its parameters tuned to strike a balance that ensures rapid exploration while lowering Metropolis-Hastings rejection probability. Conventional HMC thus, uses an auxiliary distribution that is a symmetric Gaussian for computations. It is however recognized that, in practice, the constraint of using a symmetric Gaussian for the auxiliary distribution can significantly limit speed of convergence. Further, convergence proofs of exact-dynamics HMC may not apply when the momentum distribution is asymmetric.

The illustrative embodiments provide a class of HMC methods that can utilize general auxiliary distributions such as asymmetric auxiliaries, which may better match the spread of target distributions. The methods may further significantly improve convergence speed and guarantee convergence with the use of the general auxiliary distributions. The illustrative embodiments are related to a sensory network and other processes involving measurement of sensor data and data related to physical quantities and attributes of real-world objects.

In one aspect, a method for Bayesian Variational Inference using asymmetric Hamiltonian Monte Carlo is disclosed. The method may comprise gathering a plurality of data samples for a Hamiltonian Monte Carlo computation, instantiating an auxiliary distribution on the data samples, the auxiliary distribution being asymmetric and executing a Hamiltonian Monte Carlo computation with the auxiliary distribution and the plurality of data samples. Responsive to determining that a metric of the computation outcome does not meet a target metric criterion that is based on a target distribution, the auxiliary distribution may be adapted to an output and the Hamiltonian Monte Carlo computation may be re-executed with the adapted auxiliary distribution. Upon determining that a metric of the computation outcome meets the target metric criteria, a report is generated.

Certain operations are described as occurring at a certain component or location in an embodiment. Such locality of operations is not intended to be limiting on the illustrative embodiments. Any operation described herein as occurring at or performed by a particular component, can be implemented in such a manner that one component-specific function causes an operation to occur or be performed at another component, e.g., at a local or remote engine respectively. In one aspect, the method described herein, is implemented to execute on a particularly configured computing device or data processing system, and provides substantial advancement of the functionality of that computing device or data processing system by enabling the use of general asymmetrical momentum distributions in HMC computations to not only improve convergence speed but to also guarantee convergence, making computations more efficient and facilitating the architecture of the computing platform easier to work with significantly complex models. Embodiments thus, have the capacity to improve the technical field of Variational Inference in computer systems by generalizing a dynamic auxiliary scheme using asymmetrical momentum distributions to improve performance and efficiency.

Importantly, although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail below, the operational/functional language is to be read in its proper technological context, i.e., as concrete specifications for physical implementations.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

Accordingly, one or more of the methodologies discussed herein may obviate a need for time consuming data processing by the user. This may have the technical effect of reducing computing resources used by one or more devices within the system. Examples of such computing resources include, without limitation, processor cycles, network traffic, memory usage, storage space, and power consumption.

The illustrative embodiments are described with respect to certain types of data, functions, algorithms, equations, model configurations, locations of embodiments, additional data, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to the figures and in particular with reference to FIG. 1 these figures are example diagrams of data processing environments in which illustrative embodiments may be implemented. FIG. 1 is only an example and is not intended to assert or imply any limitation with regard to the environments in which different embodiments may be implemented. A particular implementation may make many modifications to the depicted environments based on the following description.

Example Data Processing Environment

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Client 110, client 112, client 114 are also coupled to network 102. A data processing system, such as clients (client 110, client 112, client 114), Variational Inference Engine 126, device 122, and sensory system 128 may include data and may have software applications or software tools executing thereon. Server 104 and server 106 may include one or more GPUs (graphics processing units) for statistical analysis or machine learning.

Only as an example, and without implying any limitation to such architecture, FIG. 1 depicts certain components that are usable in an example implementation of an embodiment. For example, servers and clients are only examples and not to imply a limitation to a client-server architecture. As another example, an embodiment can be distributed across several data processing systems and a data network as shown, whereas another embodiment can be implemented on a single data processing system, which are all within the scope of the illustrative embodiments.

Data processing systems (Variational Inference Engine 126, server 104, server 106, client 110, client 112, client 114, sensory system 128, device 122) also represent example nodes in a cluster, partitions, and other configurations suitable for implementing an embodiment. In some embodiments, operations may be allocated among multiple computing, or processing nodes of data processing environment 100, such as servers or clients, each including one or more processing nodes, components, and modules. Each processing node may be assigned one or more samples to process according to testing or computation methods. A processing node may represent some discrete measure of computational resources. Examples of a processing node may include without limitation a processing thread, multiple processing threads, a processor, multiple processors, and so forth. One or more processing nodes may be implemented on a single device or multiple devices. For instance, when implemented by a single device such as client 110, a processing node may comprise a processing thread implemented on a single processor. In this case multiple processing nodes may be implemented as multiple processing threads on single processors, a single processing thread on each of multiple processors, multiple processing threads on multiple processors, or some combination thereof. In another example, when implemented by multiple devices, a processing node may comprise an entire computing device having one or more processors. In this case, multiple processing nodes may be implemented as two or more computing devices, such as a network of computing devices. It may be appreciated that multiple processing nodes may be implemented in any combination of single computing devices and multiple computing devices, each having one or more processors capable of executing one or more processing threads, as desired for a given implementation. The embodiments are not limited in this context. In various embodiments, multiple processing nodes may be arranged to process multiple data samples of a posterior distribution in a parallel or sequential manner. For example, server 104 and server 106 may each perform a discrete set of operations for respective data samples.

Server 104, server 106, storage unit 108, client 110, client 112, client 114, device 122, Variational Inference Engine 126 may couple to network 102 using wired connections, wireless communication protocols, or other suitable data connectivity. Client 110, client 112 and client 114 may be, for example, personal computers or network computers.

In the depicted example, the servers may provide data, such as boot files, operating system images, and applications to client 110, client 112, and client 114. Client 110, client 112 and client 114 may be clients to servers in this example. Client 110, client 112 and client 114 or some combination thereof, may include their own data, boot files, operating system images, and applications. Data processing environment 100 may include additional servers, clients, and other devices that are not shown. Server 104 may include a server application 116 that may be configured to implement one or more of the functions described herein in accordance with one or more embodiments. Server application 116, client application 124 and/or Variational Inference Engine 126 may include Variational Inference code 118 configured for Bayesian Variational Inference using Asymmetric HMC. In some embodiments, Variational Inference Engine 126 may be or form a part of a server or client described herein.

The data processing environment 100 may also include a sensory system 128, which may comprise sensors or a network of nodes that may gather sensor data. Particularly, the sensory system 128 may include measurement devices configured to perform measurements of defined properties, such as rain gauges, medical devices, vision and imaging devices, detectors, transducers, sensors, quantum tomography devices, and instruments used in measuring physical quantities and attributes of real-world objects and events.

Device 122 is an example of a device described herein. For example, device 122 can take the form of a smartphone, a tablet computer, a laptop computer, client 110 in a stationary or a portable form, a wearable computing device, or any other suitable device. Any software application described as executing in another data processing system in FIG. 1 can be configured to execute in device 122 in a similar manner. Any data or information stored or produced in another data processing system in FIG. 1 can be configured to be stored or produced in device 122 in a similar manner. Database 120 of storage unit 108 may store one or more term data samples for computations herein.

The data processing environment 100 may also be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service-oriented architecture where interoperable software components distributed across a network may be packaged together as coherent business applications. Data processing environment 100 may also take the form of a cloud and employ a cloud computing model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 200 includes an example of an environment for the execution of at least some of the computer code involved in performing the inventive methods, such as Variational Inference code 118. In addition to Variational Inference code 118, computing environment 200 includes, for example, Computer 202, wide area network 228 (WAN), end user device 230 (EUD), remote server 232, public cloud 240, and private cloud 236. In this embodiment, Computer 202 includes processor set 204 (including processing circuitry 206 and cache 208), communication fabric 210, volatile memory 212, persistent storage 214 (including operating system 216 and Variational Inference code 118, as identified above), peripheral device set 218 (including user interface (UI) device set 220, storage 222, and Internet of Things (IOT) sensor set 224), and network module 226. Remote server 232 includes remote database 234. Public cloud 240 includes gateway 238, cloud orchestration module 242, host physical machine set 246, virtual machine set 244, and container set 248.

Figure 2:
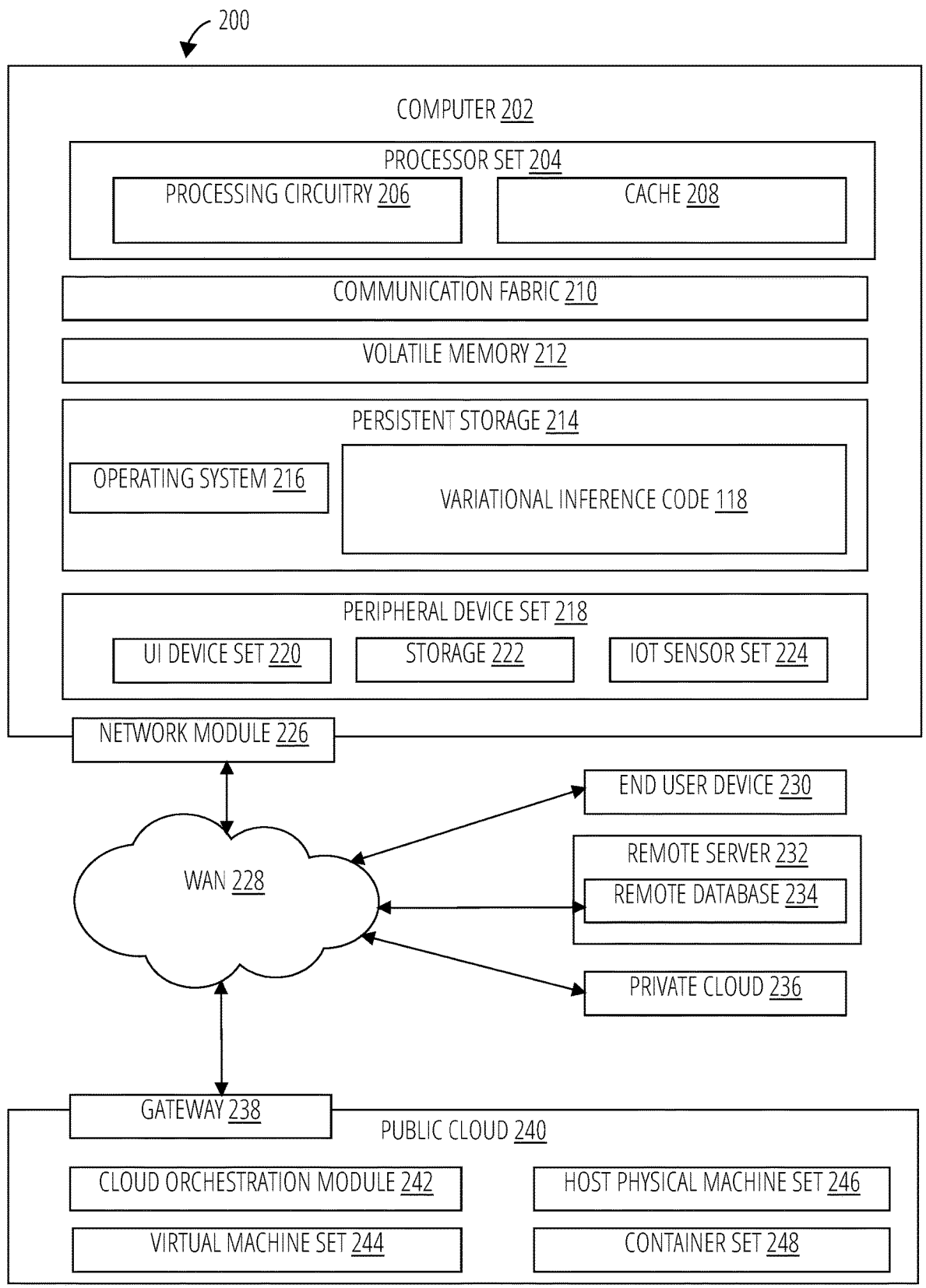
FIG. 2 depicts a block diagram of a computing environment in accordance with an illustrative embodiment.

Computer 202 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 234. As is well understood in the art of computer technology, and depending upon the technology, performance of a computer-implemented method may be distributed among multiple computers and/or between multiple locations. On the other hand, in this presentation of computing environment 200, detailed discussion is focused on a single computer, specifically Computer 202, to keep the presentation as simple as possible. Computer 202 may be located in a cloud, even though it is not shown in a cloud in FIG. 2. On the other hand, Computer 202 is not required to be in a cloud except to any extent as may be affirmatively indicated.

Processor set 204 includes one, or more, computer processors of any type now known or to be developed in the future. Processing circuitry 206 may be distributed over multiple packages, for example, multiple, coordinated integrated circuit chips. Processing circuitry 206 may implement multiple processor threads and/or multiple processor cores. Cache 208 is memory that is located in the processor chip package(s) and is typically used for data or code that should be available for rapid access by the threads or cores running on processor set 204. Cache memories are typically organized into multiple levels depending upon relative proximity to the processing circuitry. Alternatively, some, or all, of the cache for the processor set may be located "off chip." In some computing environments, processor set 204 may be designed for working with qubits and performing quantum computing.

Computer readable program instructions are typically loaded onto Computer 202 to cause a series of operational steps to be performed by processor set 204 of Computer 202 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 208 and the other storage media discussed below. The program instructions, and associated data, are accessed by processor set 204 to control and direct performance of the inventive methods. In computing environment 200, at least some of the instructions for performing the inventive methods may be stored in Variational Inference code 118 in persistent storage 214.

Communication fabric 210 is the signal conduction path that allows the various components of Computer 202 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 212 is any type of volatile memory now known or to be developed in the future. Examples include dynamic type random access memory (RAM) or static type RAM. Typically, volatile memory 212 is characterized by random access, but this is not required unless affirmatively indicated. In Computer 202, the volatile memory 212 is located in a single package and is internal to Computer 202, but, alternatively or additionally, the volatile memory may be distributed over multiple packages and/or located externally with respect to Computer 202.

Persistent storage 214 is any form of non-volatile storage for computers that is now known or to be developed in the future. The non-volatility of this storage means that the stored data is maintained regardless of whether power is being supplied to Computer 202 and/or directly to persistent storage 214. Persistent storage 214 may be a read only memory (ROM), but typically at least a portion of the persistent storage allows writing of data, deletion of data and re-writing of data. Some familiar forms of persistent storage include magnetic disks and solid-state storage devices. Operating system 216 may take several forms, such as various known proprietary operating systems or open-source Portable Operating System Interface-type operating systems that employ a kernel. The code included in Variational Inference code 118 typically includes at least some of the computer code involved in performing the inventive methods.

Peripheral device set 218 includes the set of peripheral devices of Computer 202. Data communication connections between the peripheral devices and the other components of Computer 202 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 220 may include components such as a display screen, speaker, microphone, wearable devices (such as goggles and smart watches), keyboard, mouse, printer, touchpad, game controllers, and haptic devices. Storage 222 is external storage, such as an external hard drive, or insertable storage, such as an SD card. Storage 222 may be persistent and/or volatile. In some embodiments, storage 222 may take the form of a quantum computing storage device for storing data in the form of qubits. In embodiments where Computer 202 is required to have a large amount of storage (for example, where Computer 202 locally stores and manages a large database) then this storage may be provided by peripheral storage devices designed for storing very large amounts of data, such as a storage area network (SAN) that is shared by multiple, geographically distributed computers. IoT sensor set 224 is made up of sensors that can be used in Internet of Things applications. For example, one sensor may be a thermometer and another sensor may be a motion detector.

Network module 226 is the collection of computer software, hardware, and firmware that allows Computer 202 to communicate with other computers through WAN 228. Network module 226 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 226 are performed on the same physical hardware device. In other embodiments (for example, embodiments that utilize software-defined networking (SDN)), the control functions and the forwarding functions of network module 226 are performed on physically separate devices, such that the control functions manage several different network hardware devices. Computer readable program instructions for performing the inventive methods can typically be downloaded to Computer 202 from an external computer or external storage device through a network adapter card or network interface included in network module 226.

WAN 228 is any wide area network (for example, the internet) capable of communicating computer data over non-local distances by any technology for communicating computer data, now known or to be developed in the future. In some embodiments, the WAN 228 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 230 is any computer system that is used and controlled by an end user (for example, a customer of an enterprise that operates Computer 202) and may take any of the forms discussed above in connection with Computer 202. EUD 230 typically receives helpful and useful data from the operations of Computer 202. For example, in a hypothetical case where Computer 202 is designed to provide a recommendation to an end user, this recommendation would typically be communicated from network module 226 of Computer 202 through WAN 228 to EUD 230. In this way, EUD 230 can display, or otherwise present, the recommendation to an end user. In some embodiments, EUD 230 may be a client device, such as thin client, heavy client, mainframe computer, desktop computer and so on.

Remote server 232 is any computer system that serves at least some data and/or functionality to Computer 202. Remote server 232 may be controlled and used by the same entity that operates Computer 202. Remote server 232 represents the machine(s) that collect and store helpful and useful data for use by other computers, such as Computer 202. For example, in a hypothetical case where Computer 202 is designed and programmed to provide a recommendation based on historical data, then this historical data may be provided to Computer 202 from remote database 234 of remote server 232.

Public cloud 240 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 240 is performed by the computer hardware and/or software of cloud orchestration module 242. The computing resources provided by public cloud 240 are typically implemented by virtual computing environments that run on various computers making up the computers of host physical machine set 246, which is the universe of physical computers in and/or available to public cloud 240. The virtual computing environments (VCEs) typically take the form of virtual machines from virtual machine set 244 and/or containers from container set 248. It is understood that these VCEs may be stored as images and may be transferred among and between the various physical machine hosts, either as images or after instantiation of the VCE. Cloud orchestration module 242 manages the transfer and storage of images, deploys new instantiations of VCEs and manages active instantiations of VCE deployments. Gateway 238 is the collection of computer software, hardware, and firmware that allows public cloud 240 to communicate through WAN 228.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 236 is similar to public cloud 240, except that the computing resources are only available for use by a single enterprise. While private cloud 236 is depicted as being in communication with WAN 228, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 240 and private cloud 236 are both part of a larger hybrid cloud.

Figure 3:
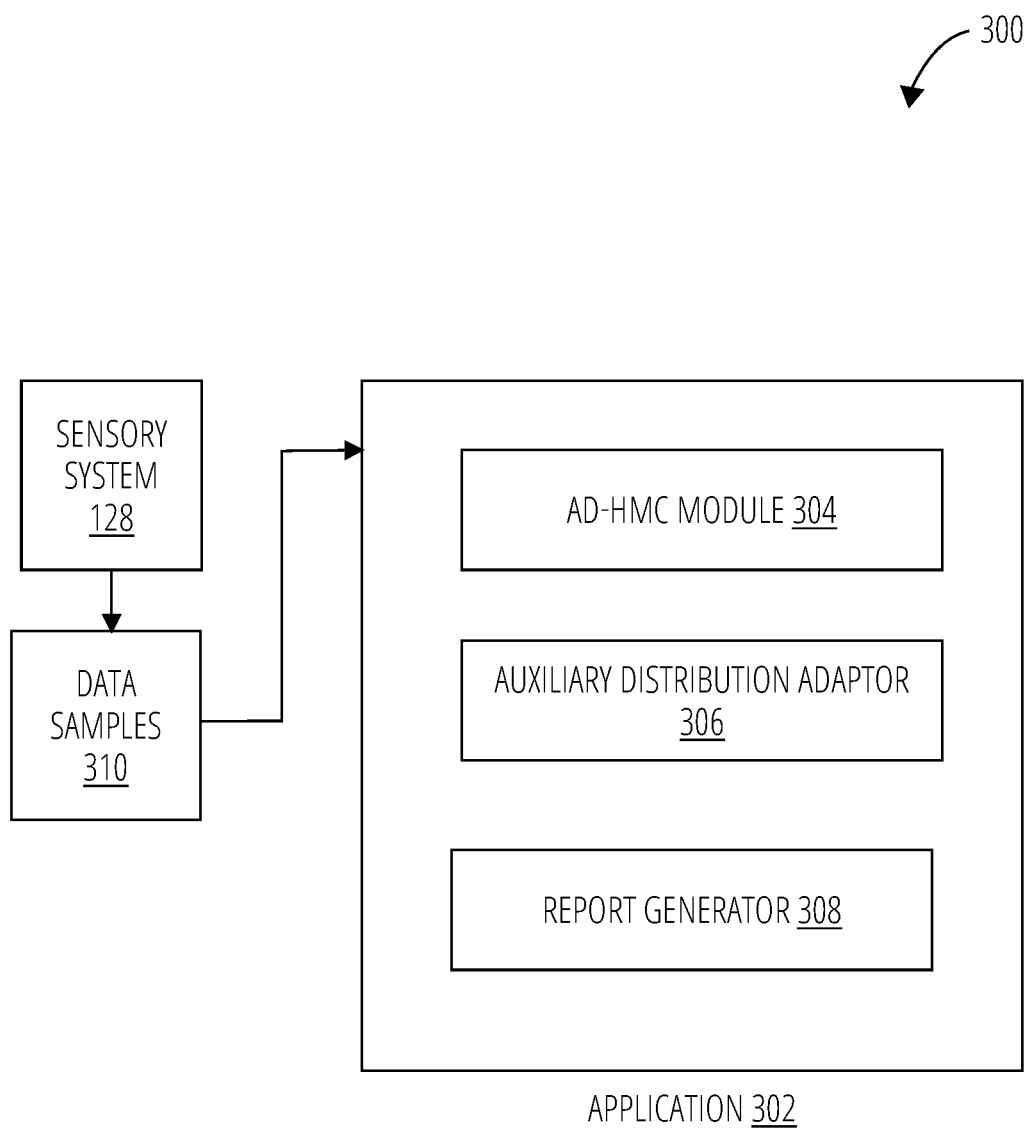
FIG. 3 depicts a Variational Inference system in accordance with an illustrative embodiment.

FIG. 3 illustrates a Bayesian Variational Inference System 300 in which the illustrative embodiments may be implemented. The Bayesian Variational Inference System 300 comprises an application 302, which may include or operate an AD-HMC (Alternating Direction Hamiltonian Monte Carlo) module 304, an auxiliary distribution adaptor 306, and a report generator 308. A plurality of data samples 310 may be obtained from the sensory system 128 for inference.

The AD-HMC module 304 may operate a modified version of HMC, an asymmetric HMC, configured to overcome the constraint of Gaussian auxiliary momentum variables, which are symmetrically distributed. Plain HMC with asymmetrical momentum distributions may lack a key self-adjointness (a characteristic that enables the proof of convergence) condition. However, a modified version of HMC, i.e., AD-HMC, as discussed hereinafter, and implemented by the application 302 can overcome the constraint. Sufficient conditions may be established under which the AD-HMC exhibits geometric convergence in Wasserstein distance. The modification may include, as described herein, applying the HMC operator and its adjoint in alternating steps, amounting to taking Hamiltonian motion in forward and backward directions. Thus, by the AD-HMC module 304, Hamiltonian motion may be alternated in forward and backward motions for a same length T (i.e., a chosen time segment of Hamiltonian motion), as denoted herein.

Further, a technique to speed up standard HMC methods may be to dynamically update the covariance matrix of a Gaussian auxiliary g(p), the motivation being to match the contours of kinetic energy V(p) (i.e., the energy associated with the motion of the particles or system being simulated) to potential energy U(q) (i.e., the energy associated with the position of the particles or system being simulated). Based on the form of an AD-HMC motion, the technique may be generalized, by the auxiliary distribution adaptor 306, which may operate an alternate adaptive scheme that dynamically constructs g(p) as a general mixture of Gaussians approximation that aims to capture all the modes of a target density of interest f(q). By so doing, AD-HMC based methods may significantly outperform standard HMC with adaptively learnt Gaussian distributions since a mixture of Gaussians (a mixture cannot be guaranteed to be symmetric) can be tuned to converge faster than Gaussian auxiliary distribution.

More specifically, with regards to the AD-HMC module 304, the AD-HMC may be performed as follows:

Initialization: potential energy U(q), kinetic energy V(p), initial iterate set $h_0=(q_{01}, \ldots, q_{0k})$, iterate trajectory length T, total number of iterations N for n=1, ..., N do
    for k=1, ..., K do
        Set $q_0 \leftarrow q_{(n-1)k}$
        Sample: $p_0 \sim g(p)$ {forward motion}
        Lift: $(q_0, p_0) \leftarrow 90$
        Apply Hamiltonian motion for length +T:
        $(Q(T), P(T)) \leftarrow (q_0, p_0)$
        Project: $q_0' \leftarrow Q(T)$
        Sample: $p_0' \sim g(p)$ {backward motion}
        Lift: $(q_0', p_0') \dashv q_0'$
        Apply Hamiltonian motion for length −T:
        $(Q(-T), P(-T)) \leftarrow (q_0', p_0')$
        Project: $q_1 \leftarrow Q(-T)$
        Set $q_{nk} \leftarrow q_1$
    end for
    Set $h_n = (q_{n1}, \ldots, q_{nx})$
end for
Return $h_N = (q_{N1}, \ldots, q_{NK})$ In the computation, Potential Energy U(q)=−log {target density}, Kinetic Energy V(p)=−log {auxiliary density g(p)}, $h_0$=initial sample (from any distribution), $p_0$=sample from auxiliary distribution, T=chosen time segment of Hamiltonian motion, $h_N$=final sample approximating target distribution, and Q and P are an outcome of the Hamiltonian motion.

Thus, upon gathering, by the sensory system 128, or a cloud network, the plurality of data samples 310, an auxiliary distribution may be instantiated on the plurality of data samples 310, the auxiliary distribution being asymmetric. Responsive to receiving the plurality of data samples, the AD-HMC module 304 may execute a Hamiltonian Monte Carlo computation with the auxiliary distribution and the plurality of data samples. Upon determining that a metric of the computation outcome does not meet a target metric criterion that is based on a target distribution, the auxiliary distribution adaptor 306 can adapt the auxiliary distribution to the output/computation outcome and the AD-HMC module 304 re-executes the Hamiltonian Monte Carlo computation with the adapted auxiliary distribution. Report generator 308 may be configured to generate a report in response to determining that the target metric is well estimated.

In an aspect, the auxiliary distribution adaptor 306 operates an "adapt-many" adaptive scheme as explained herein. Consider a generalization of the adaptive heuristic wherein the auxiliary is allowed to be a Gaussian mixture. Formally, the "adapt-many" heuristic may start with $g_0(p) \sim N(0, 1)$ and at each iteration $n=kn_a$, where (k=1, 2, ... ), the following may be performed:

1. Apply labels c=−1, 0, ..., C to the last $n_C$ samples visited at the current iterate $h_{n_a}$ using the OPTICS clustering algorithm, which dynamically determines both C and the assignment of labels; the samples in the c=−1 class denote those that were not classified.
2. For each c, let $s_c$ represent the number of samples in the class, and set $$S = \sum_{c=-1}^{C} s_c$$

Estimate the sample mean $\mu_c$ and covariance matrix $\Sigma_c$ and set $v_c = s_c/S$.
3. Set the auxiliary distribution $g_k(p) \sim \{N(\mu_c, \Sigma_c)^{w \cdot p} \cdot v_c, c=-1, \ldots, C\}$.
4. Continue the AD-HMC algorithm with $g_k(p)$ for another $n_a$ iterations.

The auxiliary distribution adaptor 306 may thus design the asymmetric auxiliary distributions as the iterations progress. As a result, convergence may be significantly sped up as shown in FIG. 4.

Figure 4:
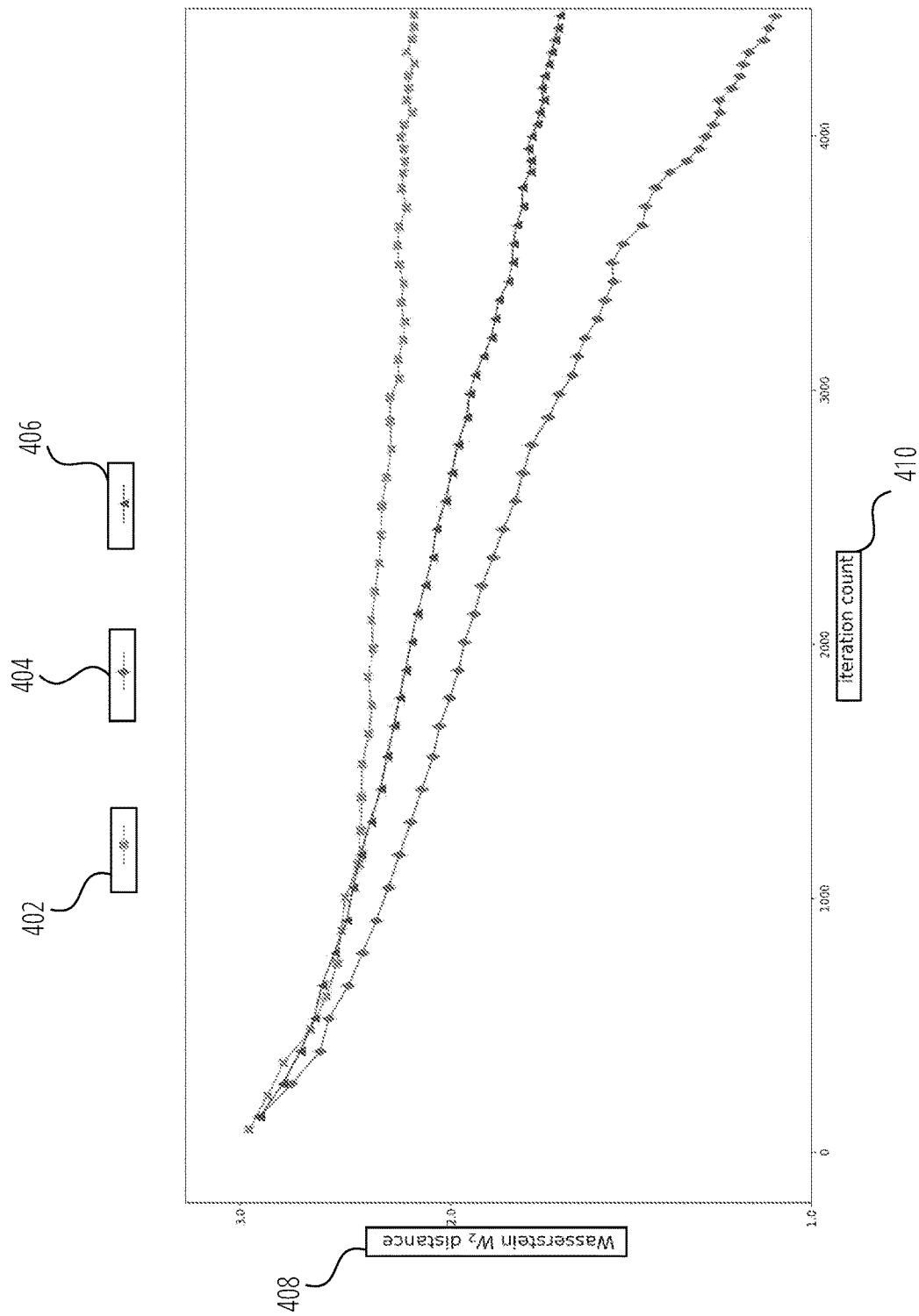
FIG. 4 depicts a plot illustrating a convergence of distributions in accordance with an illustrative embodiment.

FIG. 4 illustrates a plot comparing Wasserstein $W_2$ distance 408 (signifying the distance between a current estimate of the density and the target density) of the iterates for the AD-HMC method that is based on the adapt-many scheme 404) with the standard HMC methods having symmetric auxiliary distributions. Due to the form of the symmetric auxiliary distributions being fixed, few options exist for potentially increasing the speed of the standard HMC methods besides changing the mean and the variance of the distribution. Thus, FIG. 4 also illustrates the Wasserstein $W_2$ distance 408 for symmetric auxiliary distributions with a fixed variance 402 and an adaptive variance 406. Each method in the present examples was run for a total of ~4500 iterations. As can be seen in the plot, the AD-HMC based on the adapt-many scheme 404 converges significantly faster than the others.

Figure 5:
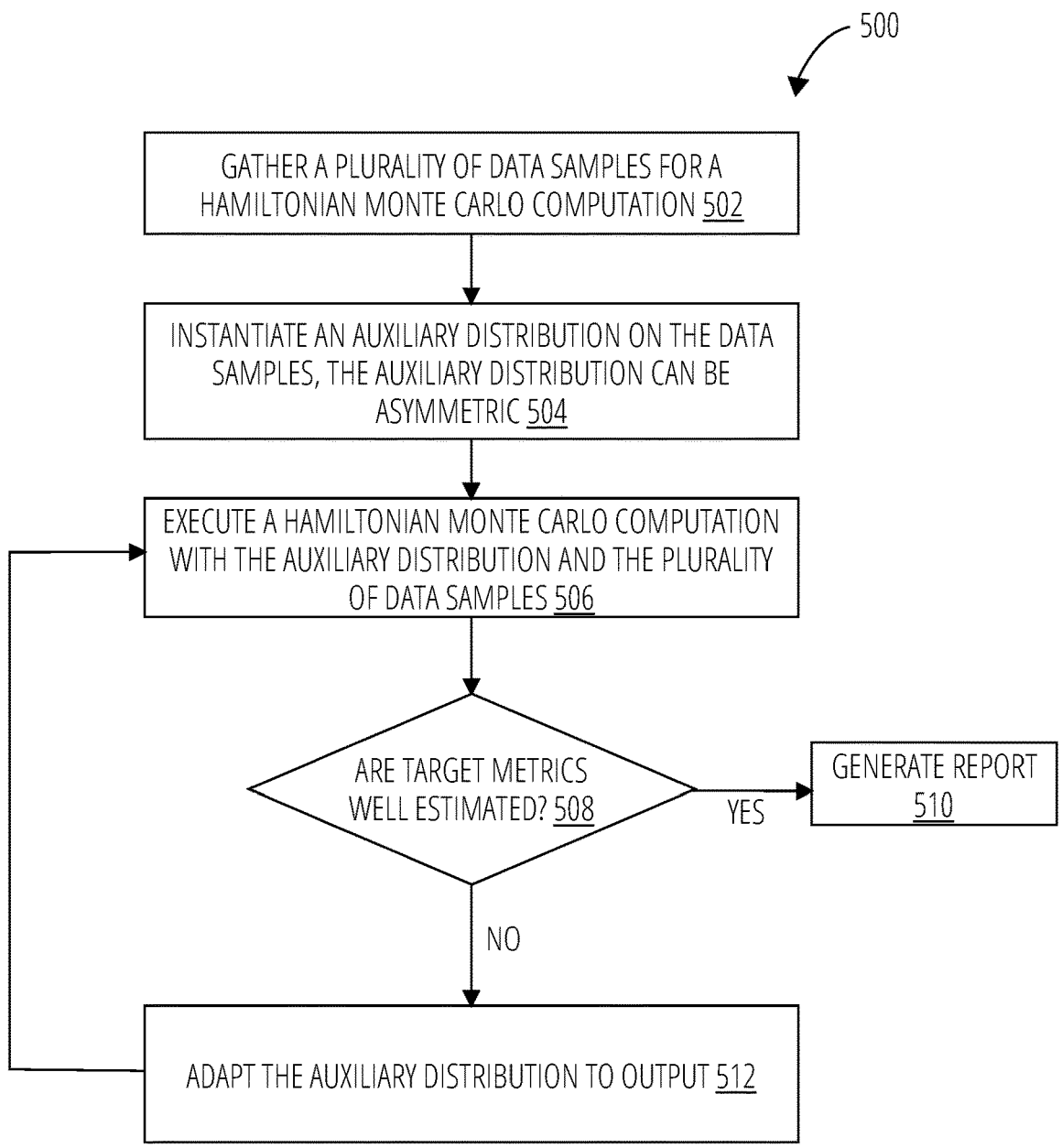
FIG. 5 depicts a routine for Bayesian Variational Inference in accordance with an illustrative embodiment.

Turning now to FIG. 5, a routine for generating a report based on Bayesian Variational Inference using Alternating Direction HMC is disclosed. In block 502, Variational Inference engine 126 may gather a plurality of data samples for a Hamiltonian Monte Carlo computation. The plurality of data samples may be used to build a Bayesian model operative to generate a gradient oracle for querying a derivative of the logarithm of the target distribution. In block 504, Variational Inference engine 126 may instantiate an auxiliary distribution on the data samples, the auxiliary distribution being asymmetric. In block 506, Variational Inference engine 126 may execute an Alternating Direction HMC computation, also referred to herein as an Asymmetric HMC, with the auxiliary distribution and the plurality of data samples. In block 512, Variational Inference engine 126 adapts, responsive to determining that a metric of the computation outcome does not meet a target metric criterion that is based on a target distribution, the auxiliary distribution to the computation outcome and re-executes the Alternating Direction Hamiltonian Monte Carlo computation with the adapted auxiliary distribution. In block 510, Variational Inference engine 126 generates a report in response to determining that the target metric is well estimated. In an illustrative embodiment, the report may contain the estimate of the metric of the computation outcome and/or some other characteristics of the sample distribution that has been computed.

In one embodiment, the auxiliary distribution may be non-Gaussian. In another embodiment, the auxiliary distribution may be instantiated as a Gaussian. Further, the auxiliary distribution may have restricted domains. For the standard auxiliary distribution, the Gaussian, may be defined on the whole space real line or the Cartesian Product of several ones. Methods herein may allow the auxiliary distribution to have domains of definition which are subsets of that of the standard.

In another embodiment, the Variational Inference engine 126 may adapt the auxiliary distribution to the output by estimating a number of modes in the target distribution and augmenting the auxiliary distribution to have the same number of modes.

In an embodiment, the Variational Inference engine 126 may adapt the auxiliary distribution to the output by designing the auxiliary distribution to be a mixture of a plurality of Gaussians. Some elements of the mixture may ensure sped up convergence in specific regions, while others may ensure that each region is visited sufficiently often or a predetermined number of times. More specifically, in the case of a regular target distribution most of the samples are concentrated around the mean. However, when the target distribution is, for example, multimodal, the concentration of the samples appears in several distinct regions. The standard Gaussian auxiliary may make it difficult for the HMC to visit such separate regions, it tends to stay in one concentration for a long time. With multimodal auxiliary it is easier to cover all the regions as needed.

Of course, the embodiments described herein are not meant to be limiting as variations thereof may be obtained in view of the descriptions herein. For example, the method may be employed in Bayesian posterior learning of near-term weather forecasting parameters. It is known that parameter posterior distribution can be highly multimodal. Standard HMC procedures may take excessively long times to converge and are therefore not useful as "online forecasts". By transforming near-term weather forecasting computations using AD-HMC with multi-modal auxiliary distribution as discussed herein, convergence may be improved and online forecasting enabled to provide actionable predictions.

In another example, the methods may be employed in the quantum tomography of multi-qubit systems. Specifically, one may want to learn the parameters that define the state of a quantum computer after several computations, which are distributed over a plurality of centers. Quantum states may decay rapidly, and standard HMC may be unable to perform state identification for large qubit systems. Quantum tomography computations may therefore employ AD-HMC described herein to improves the ability to identify the state and enable better control of multiple qubit quantum devices.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer implemented method comprising:
   gathering, by a computing device, a plurality of data samples for a Hamiltonian Monte Carlo computation;
   instantiating an auxiliary distribution on the data samples, wherein the auxiliary distribution is asymmetric;
   executing a Hamiltonian Monte Carlo computation on the computing device with the auxiliary distribution and the plurality of data samples;
   responsive to determining that a metric of an outcome of the Hamiltonian Monte Carlo computation does not meet a target metric criterion that is based on a target distribution, adapting the auxiliary distribution to the outcome of the Hamiltonian Monte Carlo computation and re-executing the Hamiltonian Monte Carlo computation with the adapted auxiliary distribution; and
   generating a report in response to determining that the metric of the outcome of the Hamiltonian Monte Carlo computation meets the target metric criteria.

2. The method of claim 1, wherein the auxiliary distribution is non-Gaussian.

3. The method of claim 1, wherein the auxiliary distribution has restricted domains.

4. The method of claim 1, wherein executing the Hamiltonian Monte Carlo computation includes executing a forward motion Hamiltonian Monte Carlo step and a backward motion Hamiltonian Monte Carlo step in alternate directions.

5. The method of claim 1, further comprising adapting the auxiliary distribution to an output by estimating a number of modes in the target distribution and augmenting the auxiliary distribution to have a same number of modes.

6. The method of claim 1, further comprising adapting the auxiliary distribution to an output by designing the auxiliary distribution to be a mixture of a plurality of gaussians,
   wherein at least one element of the mixture of the plurality of gaussians enables expediting a convergence in a specific region, and
   wherein at least one other element of the mixture of the plurality of gaussians enables each region to be visited a predetermined number of times.

7. The method of claim 1, further comprising using the plurality of data samples to build a Bayesian model to generate a gradient oracle for querying a derivative of a logarithm of the target distribution.

8. The method of claim 1, wherein the auxiliary distribution is instantiated as a Gaussian distribution.

9. The method of claim 1, wherein the plurality of data samples are obtained from a sensory system.

10. A computer program product comprising:
    one or more computer-readable storage devices and program instructions stored on at least one of the one or more computer-readable storage devices, the program instructions executable by a processor, the program instructions comprising:
    program instructions to gather a plurality of data samples for a Hamiltonian Monte Carlo computation;
    program instructions to instantiate an auxiliary distribution on the data samples, wherein the auxiliary distribution is asymmetric;
    program instructions to execute a Hamiltonian Monte Carlo computation with the auxiliary distribution and the plurality of data samples;
    program instructions to determine whether a metric of an outcome of the Hamiltonian Monte Carlo computation does not meet a target metric criterion that is based on a target distribution, adapt the auxiliary distribution to the outcome of the Hamiltonian Monte Carlo computation, and re-execute the Hamiltonian Monte Carlo computation with the adapted auxiliary distribution; and
    program instructions to generate a report in response to determining that the metric of the outcome of the Hamiltonian Monte Carlo computation meets the target metric criteria.

11. The computer program product of claim 10, wherein the auxiliary distribution is non-gaussian.

12. The computer program product of claim 10, wherein the auxiliary distribution has restricted domains.

13. The computer program product of claim 10, wherein program instructions to execute the Hamiltonian Monte Carlo computation includes program instructions to execute a forward motion Hamiltonian Monte Carlo step and a backward motion Hamiltonian Monte Carlo step in alternate directions.

14. The computer program product of claim 10, further comprising program instructions to use the plurality of data samples to build a Bayesian model to generate a gradient oracle operative to query a derivative of a logarithm of the target distribution.

15. The computer program product of claim 10, further comprising program instructions to adapt auxiliary distribution to an output by estimating a number of modes in the target distribution and augmenting the auxiliary distribution to have a same number of modes.

16. A computer-readable storage medium tangibly embodying a computer readable program code having computer readable instructions that, when executed, causes a processor to carry out a method, comprising:
- gathering a plurality of data samples for a Hamiltonian Monte Carlo computation;
- instantiating an auxiliary distribution on the data samples, wherein the auxiliary distribution is asymmetric;
- executing a Hamiltonian Monte Carlo computation with the auxiliary distribution and the plurality of data samples;
- responsive to determining that a metric of an outcome of the Hamiltonian Monte Carlo computation does not meet a target metric criterion that is based on a target distribution, adapting the auxiliary distribution to the outcome of the Hamiltonian Monte Carlo computation and re-executing the Hamiltonian Monte Carlo computation with the adapted auxiliary distribution; and
- generating a report in response to determining that the metric of the outcome of the Hamiltonian Monte Carlo computation meets the target metric criteria.

17. The computer-readable storage medium of claim 16, wherein the auxiliary distribution is non-gaussian.

18. The computer-readable storage medium of claim 16, wherein the auxiliary distribution has restricted domains.

19. The computer-readable storage medium of claim 16, wherein the processor further executes the Hamiltonian Monte Carlo computation by executing a forward motion Hamiltonian Monte Carlo step and a backward motion Hamiltonian Monte Carlo step in alternate directions.

20. The computer-readable storage medium of claim 16, wherein the processor uses the plurality of data samples to build a Bayesian model to generate a gradient oracle to query a derivative of a logarithm of the target distribution.

\* \* \* \* \*